(12) United States Patent
Lee et al.

(10) Patent No.: US 12,484,123 B2
(45) Date of Patent: Nov. 25, 2025

(54) DISPLAY MODULE

(71) Applicant: E Ink Holdings Inc., Hsinchu (TW)

(72) Inventors: Kun-Hsien Lee, Hsinchu (TW);
Ching-Huan Liao, Hsinchu (TW);
Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 185 days.

(21) Appl. No.: 18/473,271

(22) Filed: Sep. 24, 2023

(65) Prior Publication Data
US 2024/0224394 A1 Jul. 4, 2024

(30) Foreign Application Priority Data
Dec. 29, 2022 (TW) .................................. 111150561

(51) Int. Cl.
| | | |
|---|---|---|
| *H05B 45/28* | (2020.01) | |
| *F21V 8/00* | (2006.01) | |
| *G02B 27/09* | (2006.01) | |
| *G02B 27/30* | (2006.01) | |
| *H05B 47/155* | (2020.01) | |

(52) U.S. Cl.
CPC .......... *H05B 45/28* (2020.01); *G02B 6/0028* (2013.01); *G02B 27/0922* (2013.01); *G02B 27/0977* (2013.01); *G02B 27/30* (2013.01); *H05B 47/155* (2020.01)

(58) Field of Classification Search
CPC .... H05B 45/28; H05B 47/155; G02B 6/0028; G02B 27/0922; G02B 27/0977; G02B 27/30; G02B 6/0055; G02B 6/0068; G02B 6/0073
USPC ...................................................... 315/309
See application file for complete search history.

(56) References Cited

U.S. PATENT DOCUMENTS

| | | |
|---|---|---|
| 8,434,909 B2 | 5/2013 | Nichol et al. |
| 8,950,902 B2 | 2/2015 | Nichol et al. |
| 9,307,609 B2 * | 4/2016 | Huang ................... H05B 45/20 |
| 9,472,128 B2 | 10/2016 | Rosenthal |

(Continued)

FOREIGN PATENT DOCUMENTS

| | | |
|---|---|---|
| CN | 210803770 U | 6/2020 |
| JP | 5365658 B2 | 12/2013 |
| TW | 202242462 A | 11/2022 |

OTHER PUBLICATIONS

The office action of corresponding TW application No. 111150561 issued on Nov. 2, 2023.

*Primary Examiner* — Ryan Jager
(74) *Attorney, Agent, or Firm* — CKC & Partners Co., LLC

(57) ABSTRACT

A display module includes a front light module and a reflective display panel. The front light module comprises a light source and a light guide plate. The light source comprises a plurality of major light sources comprising a first color temperature and a plurality of auxiliary light sources comprising a second color temperature. The first color temperature is different from the second color temperature. The light guide plate comprises a front surface comprising a light mixing area and an active area. The light mixing area comprises a light entrance surface. The light source is disposed adjacent to the light entrance surface. The reflective display panel is disposed on a back surface of the light guide plate. The light mixing area of the light guide plate is foldable. When the light mixing area is folded, the light mixing area is on the back surface of the light guide plate.

16 Claims, 13 Drawing Sheets

(56) References Cited

U.S. PATENT DOCUMENTS

| | | | |
|---|---|---|---|
| 10,215,905 B2 | 2/2019 | Nichol et al. | |
| 10,393,941 B2 | 8/2019 | Nichol et al. | |
| 12,124,075 B2* | 10/2024 | Lee | G02B 6/0063 |
| 2007/0274093 A1* | 11/2007 | Haim | G02F 1/133603 |
| | | | 362/561 |
| 2008/0238335 A1* | 10/2008 | Lee | H05B 45/22 |
| | | | 315/294 |
| 2010/0244701 A1* | 9/2010 | Chen | G09G 3/3426 |
| | | | 315/117 |
| 2012/0286699 A1* | 11/2012 | Yan | F21K 9/64 |
| | | | 315/294 |
| 2014/0252985 A1* | 9/2014 | Huang | H05B 45/20 |
| | | | 315/294 |
| 2015/0338565 A1* | 11/2015 | Pao | G02B 6/0036 |
| | | | 362/606 |
| 2016/0004004 A1* | 1/2016 | Pao | G09G 3/3413 |
| | | | 362/606 |
| 2016/0291238 A1* | 10/2016 | Tai | G02F 1/13338 |
| 2017/0082792 A1* | 3/2017 | Liao | G02B 6/0013 |
| 2017/0329070 A1* | 11/2017 | Shih | G02B 6/0036 |
| 2018/0143459 A1* | 5/2018 | Tai | G02F 1/1677 |
| 2019/0080644 A1* | 3/2019 | Tai | G09G 3/3426 |
| 2022/0137283 A1* | 5/2022 | Huang | G02B 6/0088 |
| | | | 362/609 |
| 2024/0134107 A1* | 4/2024 | Huang | G02B 6/0088 |
| 2024/0184036 A1* | 6/2024 | Lee | G02B 6/0073 |
| 2024/0224394 A1* | 7/2024 | Lee | H05B 47/155 |
| 2024/0230976 A9* | 7/2024 | Huang | G02B 6/005 |
| 2024/0241304 A1* | 7/2024 | Tsai | G02B 6/0023 |
| 2025/0028109 A1* | 1/2025 | Lee | G02B 6/0065 |
| 2025/0102723 A1* | 3/2025 | Huang | G02B 6/005 |
| 2025/0123439 A1* | 4/2025 | Chen | G02B 6/0038 |
| 2025/0147219 A1* | 5/2025 | Ho | G02B 6/0036 |

\* cited by examiner

|  | Embodiment 1 |
|---|---|
| Pitch between major light sources, P1 (mm) | 11 |
| Pitch between auxiliary light sources, P2 (mm) | 40 |
| Length of mixing area, A (mm) | 30 |
| A/P1 | 2.7 |
| A/P2 | 0.75 |

Fig. 4

|  | Color temperature (K) | Target brightness (nits) | Light source | | Forward current (mA) |
|---|---|---|---|---|---|
|  |  |  | Major light source | Auxiliary light source |  |
| Embodiment 2 | 6500 | 100 | 3 | 0 | 120 |
| Embodiment 3 | <6500 | 100(optional) | 3 | 1 | 90 |

Fig. 7

| | Black/White EPD (B/W EPD) | EPD with color filter layer (Kaleido EPD) | EPD with color electrophoretic particles (Gallery 3 EPD) |
|---|---|---|---|
| Contrast example 1 | ○ | △ | △ |
| Contrast example 2 | ○ | ◎ | ○ |
| Embodiment 4 | ○ | ○ | ◎ |

△ : Normal     ○ : Good     ◎ : Excellent

Fig. 10

|  | Black/White EPD (B/W EPD) | EPD with color filter layer (Kaleido EPD) | EPD with color electrophoretic particles (Gallery 3 EPD) |
| --- | --- | --- | --- |
| Contrast example 3 | ○ | △ | ○ |
| Embodiment 5 | ○ | ◎ | ◎ |

△ : Normal   ○ : Good   ◎ : Excellent

Fig. 14

DISPLAY MODULE

CROSS-REFERENCE TO RELATED APPLICATION

This application claims priority to Taiwan Application Serial Number 111150561, filed Dec. 29, 2022, which is herein incorporated by reference in its entirety.

BACKGROUND

Field of Invention

The disclosure relates to a display module. More particularly, the present disclosure relates to a display module including a light guide plate having a light mixing area being foldable.

Description of Related Art

In the existing front light module, the light guide plate used therein is thicker and thus cannot be folded easily. Therefore, the light source bar and the light guide plate are on the same plane. Considering a frame width of the display device, a light mixing area of the light guide plate cannot be lengthened arbitrarily. If an adjustable color temperature is further considered, that is, a light source bar has light emitting diodes (LEDs) having at least two color temperatures, assuming that some of them are cold light LEDs and the other are warm light LEDs, the LEDs having these two color temperatures should have an arrangement complying with a design rule, that is, a cycle spacing of the LED<a length of the light mixing area/0.7. If the cycle spacing exceeds this limitation, it causes discomfort in the image, which is commonly known as a hot spot effect.

Generally, a quantity and the arrangement of the cold light LEDs are similar to that of the warm light LEDs to meet the technical and cost requirements. That is, assuming that the color temperature of the display of the panel is dominated by cold light and supplemented by warm light, the quantity of the warm light LEDs does not need to be so many. However, to avoid the hot spot effect, the quantity of the warm light LEDs should be increased such that the cost of the light source bar increases.

SUMMARY

The present disclosure provides a display module having a light guide plate having a light mixing area being foldable, thereby increasing a length of the light mixing area to reduce a quantity of auxiliary light sources.

The present disclosure provides a display module including a front light module and a reflective display panel. The front light module comprises a light source and a light guide plate. The light source comprises a plurality of major light sources and a plurality of auxiliary light sources. The plurality of major light sources comprises a first color temperature. The plurality of auxiliary light sources comprises a second color temperature. The first color temperature is different from the second color temperature. The light guide plate comprises a front surface comprising a light mixing area and an active area. The light mixing area comprises a light entrance surface. The light source is disposed adjacent to the light entrance surface. The reflective display panel is disposed on a back surface of the light guide plate. The light mixing area of the light guide plate is foldable. When the light mixing area is folded, the light mixing area is on the back surface of the light guide plate.

According to an embodiment of the present disclosure, a quantity of the plurality of auxiliary light sources is less than a quantity of the plurality of major light sources.

According to an embodiment of the present disclosure, a quantity of the plurality of major light sources is greater than 2 times of a quantity of the plurality of auxiliary light sources.

According to an embodiment of the present disclosure, the first color temperature is cold light, and the second color temperature is warm light.

According to an embodiment of the present disclosure, the plurality of major light sources has a spacing P1, the light mixing area has a length A extending along a direction perpendicular to the light entrance surface and satisfy an equation: $P1<A/0.7$.

According to an embodiment of the present disclosure, the plurality of auxiliary light sources has a spacing P2, the light mixing area has a length A extending along a direction perpendicular to the light entrance surface and satisfy an equation: $P2<A/0.7$.

According to an embodiment of the present disclosure, the display module further comprises a light mixer disposed adjacent to the light entrance surface of the light guide plate. The light source is disposed on a side surface of the light mixer.

According to an embodiment of the present disclosure, the light source has a color rendering index (CRI) greater than 80.

According to an embodiment of the present disclosure, the front surface of the light guide plate further comprises a collimated structure to convert a light passing through the front surface into a collimated light. An angle between the collimated light and a direction perpendicular to the front surface of the light guide plate is in a range from 25° to 45°.

According to an embodiment of the present disclosure, the collimated light has a full width at half maximum (FWHM) less than 25°.

Based on above, the light mixing area of the light guide plate of the display module according to the present disclosure is foldable. When the light mixing area is folded, the light mixing area is on the back surface of the light guide plate, thereby increasing a length of the light mixing area to reduce a quantity of auxiliary light sources.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 4 is parameters of the display module of embodiment 1 in accordance with some embodiments of the present disclosure.

FIG. 7 is parameters of the display module in accordance with embodiment 2 and embodiment 3 of the present disclosure.

FIG. 10 is a display performance of the light source of embodiment 4, the light source of contrast example 1, and the light source of contrast example 2 applied to a black and white electrophoretic display, an electrophoretic display using a color filter layer, and an electrophoretic display using colored electrophoretic particles.

FIG. 14 is a display performance of the reflective display panel of the embodiment 5 of FIG. 8 and a reflective display of contrast example 3 applied to a black and white electrophoretic display, an electrophoretic display using a color filter layer, and an electrophoretic display using colored electrophoretic particles.

DETAILED DESCRIPTION

Figure 1:
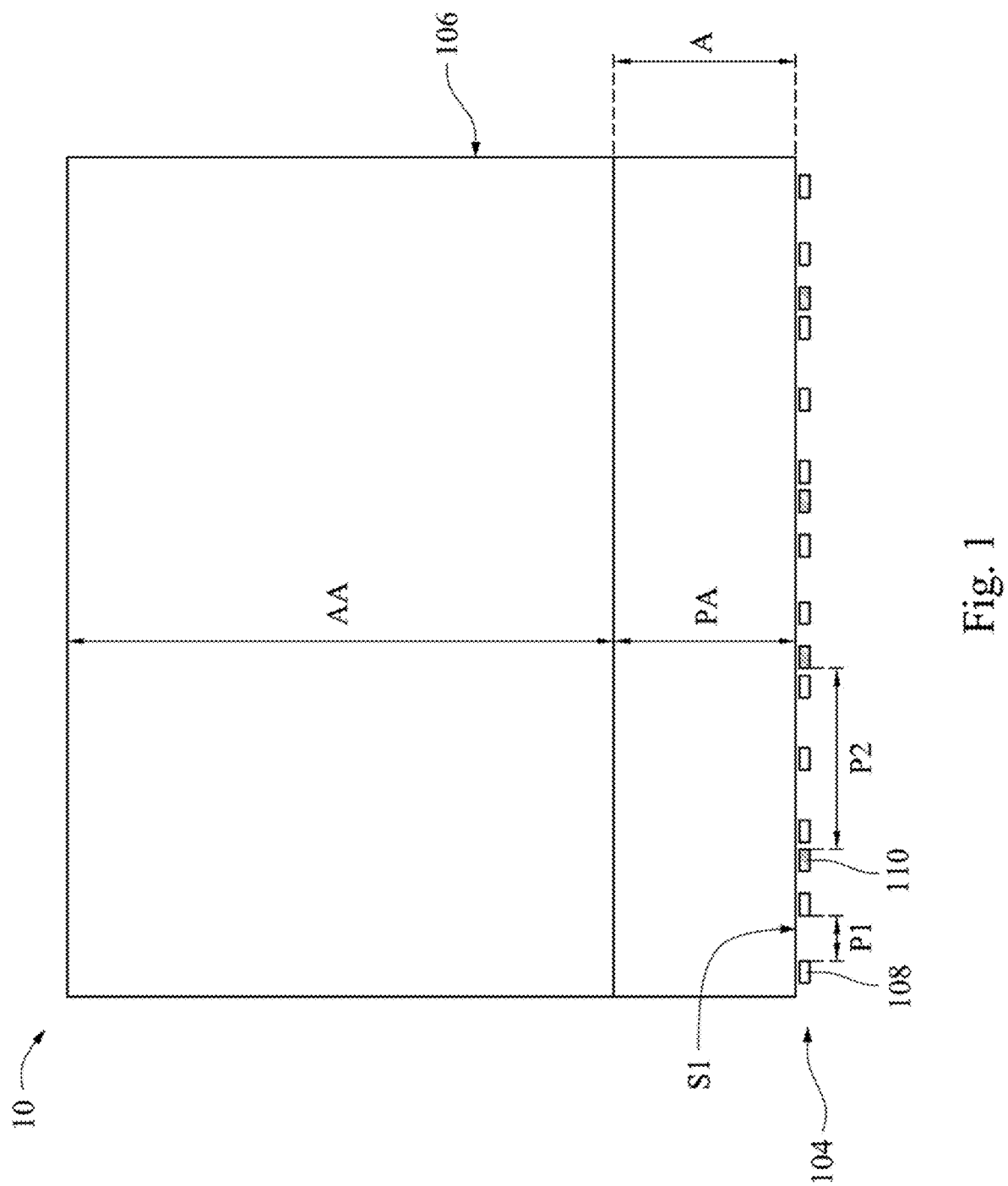
FIG. 1 is a top view of a display module in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
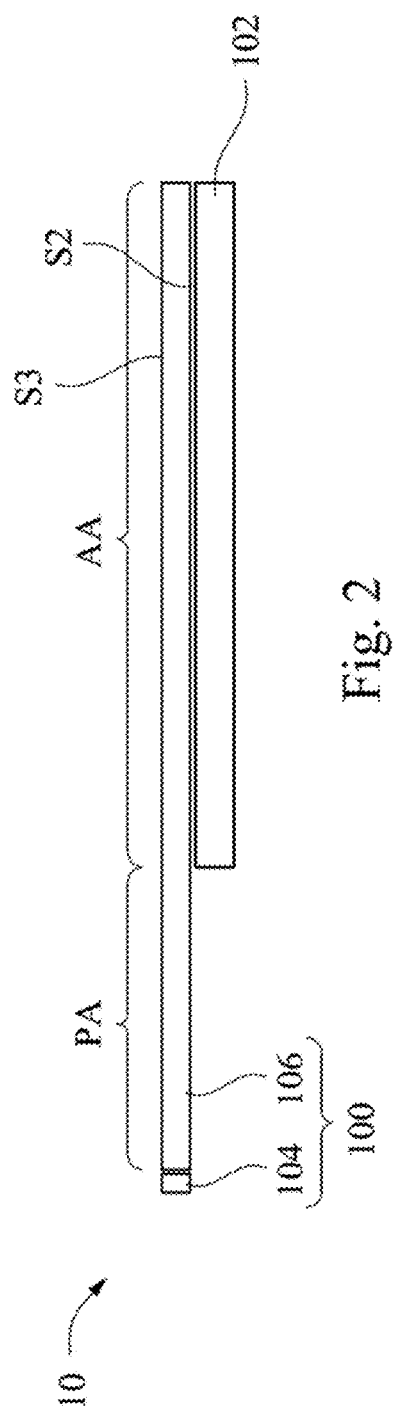
FIG. 2 is a cross-sectional view of FIG. 1.

FIG. 1 is a top view of a display module 10 in accordance with some embodiments of the present disclosure. FIG. 2 is a cross-sectional view of FIG. 1. Reference is made to FIGS. 1 and 2. The display module 10 includes a front light module 100 and a reflective display panel 102. The front light module 100 includes a light source 104 and a light guide plate 106. The light source 104 includes a plurality of major light sources 108 and a plurality of auxiliary light sources 110. The major light sources 108 and the auxiliary light sources 110 emit, for example, a white light. In some embodiments, the major light sources 108 include a blue light emitting diode and a phosphor structure, and the auxiliary light sources 110 include a blue light emitting diode and a phosphor structure. The major light sources 108 include a first color temperature. The auxiliary light sources 110 include a second color temperature. The first color temperature is different from the second color temperature, thereby providing a color temperature modulation (CTM) for the display module 10.

Figure 3:
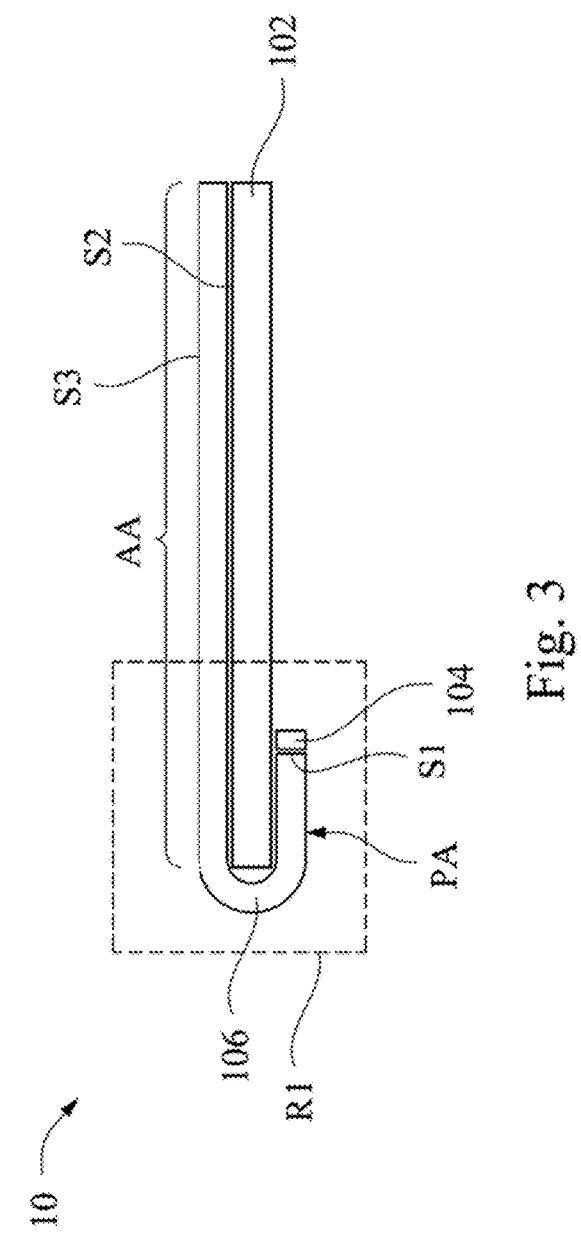
FIG. 3 is a schematic view of the display module of FIG. 2 in which the light mixing area of the light guide plate is folded.

The light guide plate 106 includes a front surface S3 including a light mixing area PA and an active area AA. The light mixing area PA has a light entrance surface S1. The light source 104 is disposed adjacent to the light entrance surface S1. The reflective display panel 102 is on a back surface S2 of the light guide plate 106. The light mixing area PA of the light guide plate 106 is foldable. FIG. 3 is a schematic view of the display module 10 of FIG. 2 in which the light mixing area PA of the light guide plate 106 is folded. Referring to FIG. 3, when the light mixing area PA is folded, the light source 104 and the light mixing area PA are on the back surface S2 of the light guide plate 106. In some embodiments, the light guide plate 106 has a thinned thickness to achieve a foldable property. In some embodiments, the light guide plate 106 has a material of polycarbonate (PC) and has a refractive index in a range from 1.49 to 1.6.

Referring to FIG. 1, in some embodiments, the major light sources 108 are arranged at intervals. For example, the major light sources 108 have a spacing P1. The light mixing area PA has a length A along a direction perpendicular to the light entrance surface S1, satisfying an equation: P1<A/0.7. In other words, A/P1 is greater than 0.7. In some embodiments, the auxiliary light sources 110 has a spacing P2 which satisfies an equation: P2<A/0.7. Therefore, without considering a dot alignment design of the light guide plate 106, by satisfying this equation, the discomfort in the image of the display module 10 caused by the hot spot effect can be prevented.

The light mixing area PA of the light guide plate 106 is foldable, thereby increasing the length A of the light mixing area PA. In the case of satisfying the equation: P1<A/0.7 and P2<A/0.7, since the length A is increased, the spacing P1 and the spacing P2 can be increased. By increasing the spacing P1 and the spacing P2, the major light sources 108 and the auxiliary light sources 110 can have sufficient tolerance to the spacing. For example, when the auxiliary light sources 110 have a reduced quantity such that spacing P2 is increased, the above equation can still be satisfied. In some embodiments, the spacing P2 is greater than the spacing P1.

In some embodiments, the first color temperature of the major light sources 108 is cold light. The second color temperature of the auxiliary light sources 110 is warm light. The quantity of the auxiliary light sources 110 is less than the quantity of the major light sources 108 such that the color temperature of the image of the display module 10 is dominated by cold light and supplemented by warm light. Since the auxiliary light sources 110 have sufficient tolerance to the spacing, there is no need to increase the quantity of the auxiliary light sources 110 to reduce the spacing P2 in order to prevent the hot spot effect, which may increase the cost of the light source 104. In some embodiments, the quantity of the major light sources 108 is greater than 2 times of the quantity of the auxiliary light sources 110. FIG. 4 is parameters of the display module 10 in accordance with embodiment 1 of the present disclosure. Reference is made to FIGS. 1 and 4. The light mixing area PA has the length A of about 30 mm. The quantity of the major light sources 108 is three times of the quantity of the auxiliary light sources 110. For example, the quantity of the major light sources 108 is 12, and the quantity of the auxiliary light sources 110 is 4. The major light sources 108 are configured to keep sufficient brightness. The major light sources 108 have the spacing P1 of 11 mm. The auxiliary light sources 110 have the spacing P2 of 40 mm. Therefore, A/P1 is 2.7, and A/P2 is 0.75, which are both greater than 0.7.

Figure 5:
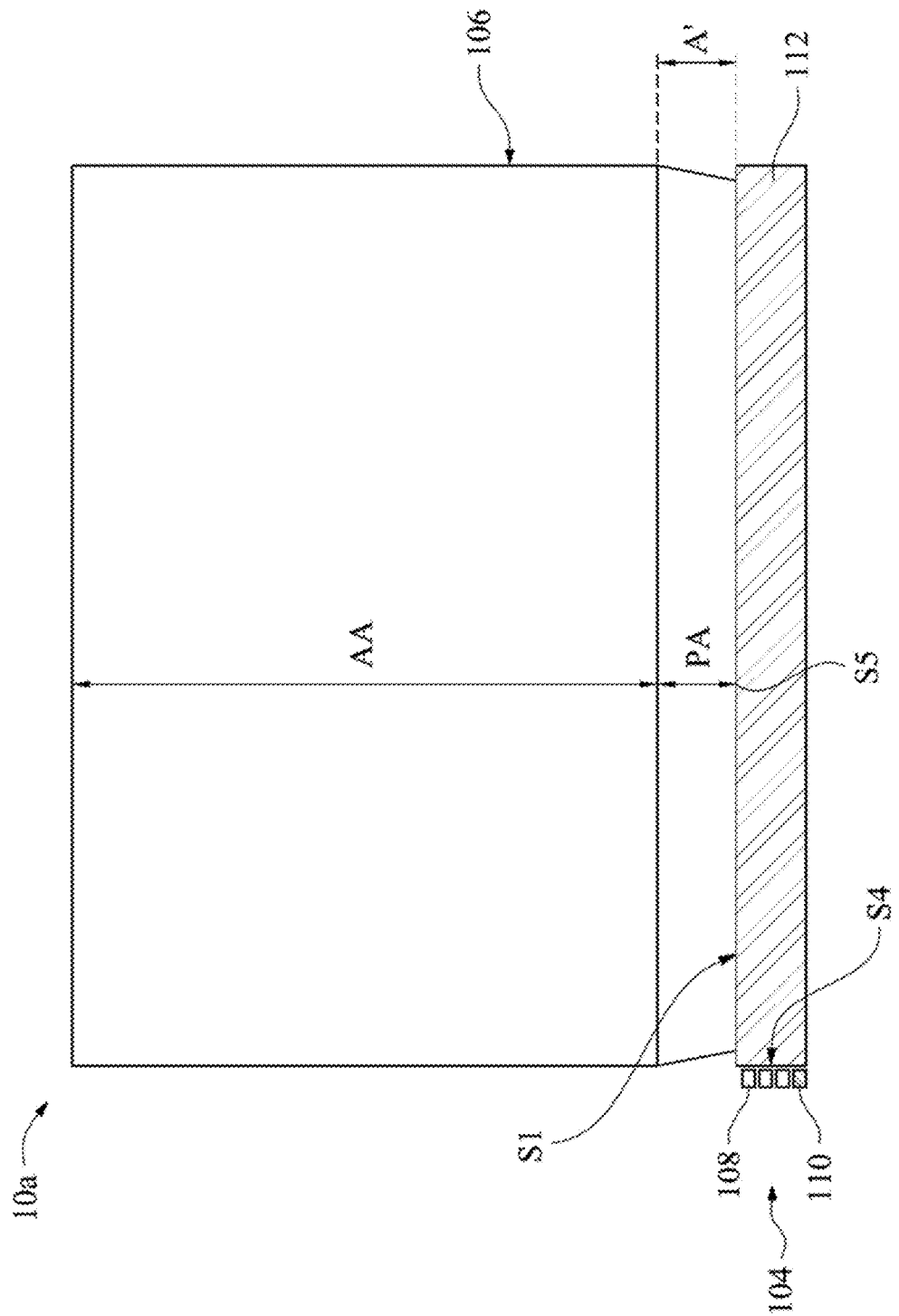
FIG. 5 is a top view of a display module in accordance with some other embodiments of the present disclosure.
Figure 6:
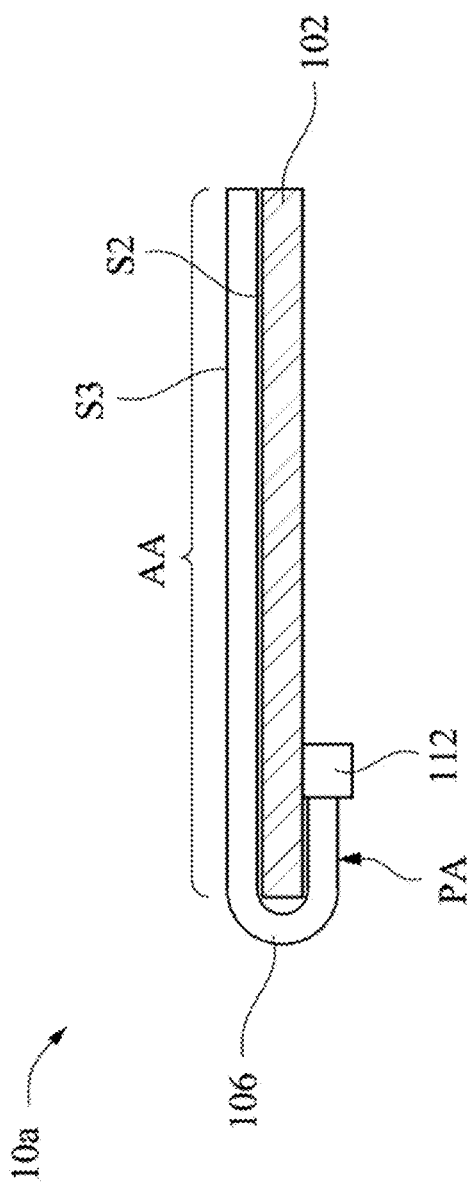
FIG. 6 is a schematic view of the display module of FIG. 5 in which the light mixing area of the light guide plate is folded.

FIG. 5 is a top view of a display module 10a in accordance with some other embodiments of the present disclosure. Referring to FIG. 5, the main difference between the display module 10a and the above-mentioned display module 10 is that the display module 10a further includes a light mixer 112. The light mixer 112 is disposed adjacent to the light entrance surface S1 of the light guide plate 106. The light source 104 is disposed on a side surface S4 of the light mixer 112. The light mixer 112 is configured to mix a light incident from the light source 104, which is advantageous for a uniform distribution of the first light and the second light before entering the light mixing area PA. The light mixing area PA of the light guide plate 106 is foldable. FIG. 6 is a schematic view of the display module 10a of FIG. 5 in which the light mixing area PA of the light guide plate 106 is folded. Reference is made to FIG. 6. When the light mixing area PA of the light guide plate 106 is folded, the light source 104, the light mixing area PA and the light mixer 112 are on the back surface S2 of the light guide plate 106.

Reference is made to FIGS. 5 and 6. Because the light mixing area PA of the light guide plate 106 is foldable and the light mixer 112 is disposed adjacent to the light entrance surface S1 of the light guide plate 106, the light mixer 112 can be folded to the back surface of the light guide plate 106. Because the light mixer 112 is configured to mix light, the area (length) of light mixing can be extended. In some embodiments, the light mixer 112 includes a connecting surface S5 connecting the light entrance surface S1 of the light guide plate 106 and a side surface S4 abutting the connecting surface S5. The side surface S4 is shorter than the connecting surface S5. As discussed previously, because the spacing P2 of the auxiliary light sources 110 have the sufficient tolerance to the spacing, the light source 104 can be disposed on the side surface S4 of the light mixer 112. The quantity of the auxiliary light sources 110 can be reduced.

In some embodiments, the first color temperature of the major light sources 108 is cold light, and the second color temperature of the auxiliary light sources 110 is warm light. The quantity of the auxiliary light sources 110 is less than the quantity of the major light sources 108 such that the color temperature of the image of the display module 10a is dominated by cold light and supplemented by warm light. Because the auxiliary light sources 110 have the sufficient tolerance to the spacing, there is no need to increase the quantity of the auxiliary light sources 110 to reduce the spacing in order to prevent the hot spot effect, which increases the cost of the light source 104. In some embodiments, the quantity of the major light sources 108 is greater than 2 times of the auxiliary light sources 110. FIG. 7 is parameters of the display module 10a in accordance with embodiment 2 and embodiment 3 of the present disclosure. Reference is made to FIGS. 5 and 7. The mixing area PA has the length A' of about 10 mm. In the embodiment 2, the quantity of the major light sources 108 is 3 and there is no auxiliary light source 110. In the embodiment 3, the quantity of the major light sources 108 is three times of the quantity of the auxiliary light sources 110. For example, the quantity of the major light sources 108 is 3, and the quantity of the auxiliary light sources 110 is 1. The major light sources 108 are configured to keep sufficient brightness. For example, in the display module 10a in accordance with the embodiment 2 and embodiment 3, by the forward current (drive current) to allow the light source 104 to emit light, a target brightness of 100 nits is reached. In the display module 10a in accordance with the embodiment 2, its color temperature is 6500 K and its forward current is 120 mA. In the display module 10a in accordance with the embodiment 3, its color temperature is less than 6500 K and its forward current is 90 mA. Accordingly, the display module 10a in accordance with the embodiment 2 and embodiment 3 have forward current less than known forward current (about 250 mA).

Figure 8:
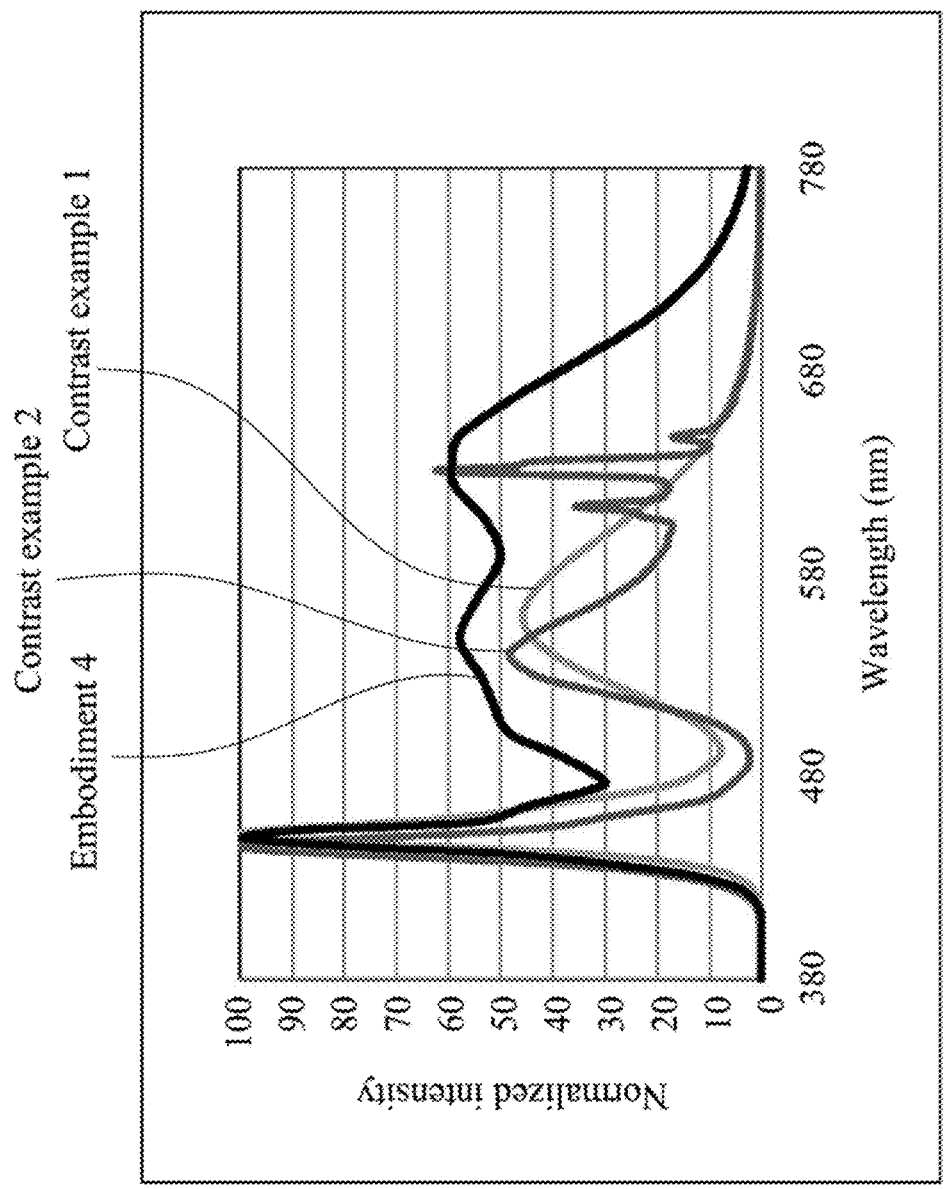
FIG. 8 is an emission spectrum of a light source in accordance with embodiment 4 of the present disclosure, a light source of contrast example 1 and a light source of contrast example 2.

FIG. 8 is an emission spectrum of a light source 104 in accordance with embodiment 4 of the present disclosure, a light source of contrast example 1 and a light source of contrast example 2. Reference is made to FIGS. 1 and 8. The light source of contrast example 1 is a blue light emitting diode and a yellow phosphor ($Y_3Al_5O_{12}:Ce^{3+}$, YAG). The light source of contrast example 2 is a blue light emitting diode, a red green (RG) phosphor and a fluoride phosphor ($K_2SiF_6:Mn^{4+}$, KSF). The light source 104 of the embodiment 4 is a high color rendering index (CRI) light source. For example, the light source 104 of the embodiment 4 has a color rendering index (CRI) greater than 80, such as being 95. The light source 104 of the embodiment 4 has a spectrum wider than a spectrum of the light source of the contrast example 1 and the light source of the contrast example 2, and similar to a black body or a daylight source.

Figure 9:
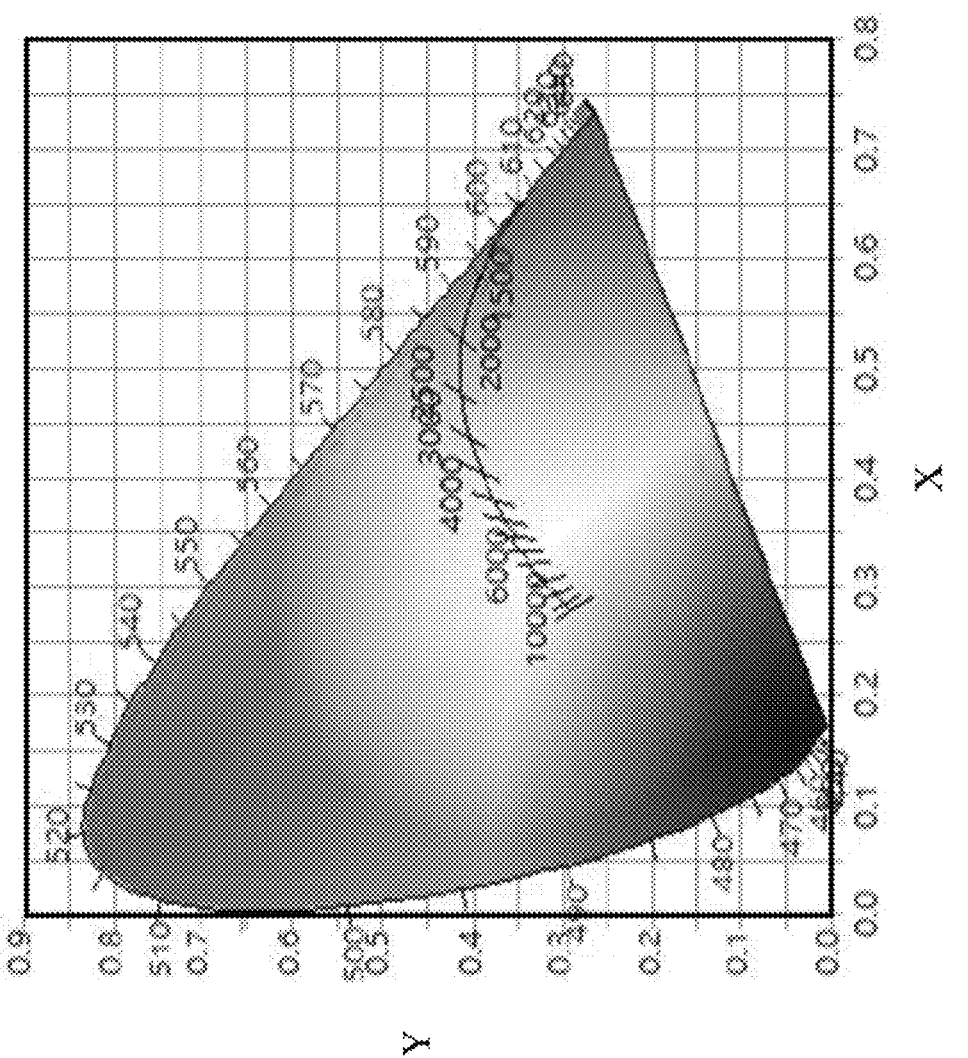
FIG. 9 is a CIE color chart of the major light source in accordance with some embodiments of the present disclosure.

FIG. 9 is a CIE color chart (CIE 1931 color space chromaticity diagram) of the major light source 108 in accordance with some embodiments of the present disclosure. Reference is made to FIGS. 1 and 8. The first color temperature of the major light sources 108 is cold light. Reference is made to FIGS. 1, 8 and 9. The spectrum of the major light source 108 includes a red light, a green light, a blue light, a cyan light, a magenta light and a yellow light. The red light has a wavelength in a range from 600 nm to 650 nm. The green light has a wavelength in a range from 520 nm to 560 nm. The blue light has a wavelength in a range from 420 nm to 470 nm. The cyan light has a wavelength in a range from 480 nm to 500 nm. The magenta light is a combination of the red light and the green light. The yellow light has a wavelength in a range from 560 nm to 580 nm.

FIG. 10 is a display performance of the light source 104 of embodiment 4, the light source of contrast example 1, and the light source of contrast example 2 applied to a black and white electrophoretic display, an electrophoretic display using a color filter layer, and an electrophoretic display using colored electrophoretic particles. Reference is made to FIGS. 1, 8 and 10. In the electrophoretic display using the color filter layer and the electrophoretic display using the colored electrophoretic particles, the efficiency of the light source 104 of example 4 is better than that of the light source of the contrast example 1 and the light source of the contrast example 2.

Figure 11:
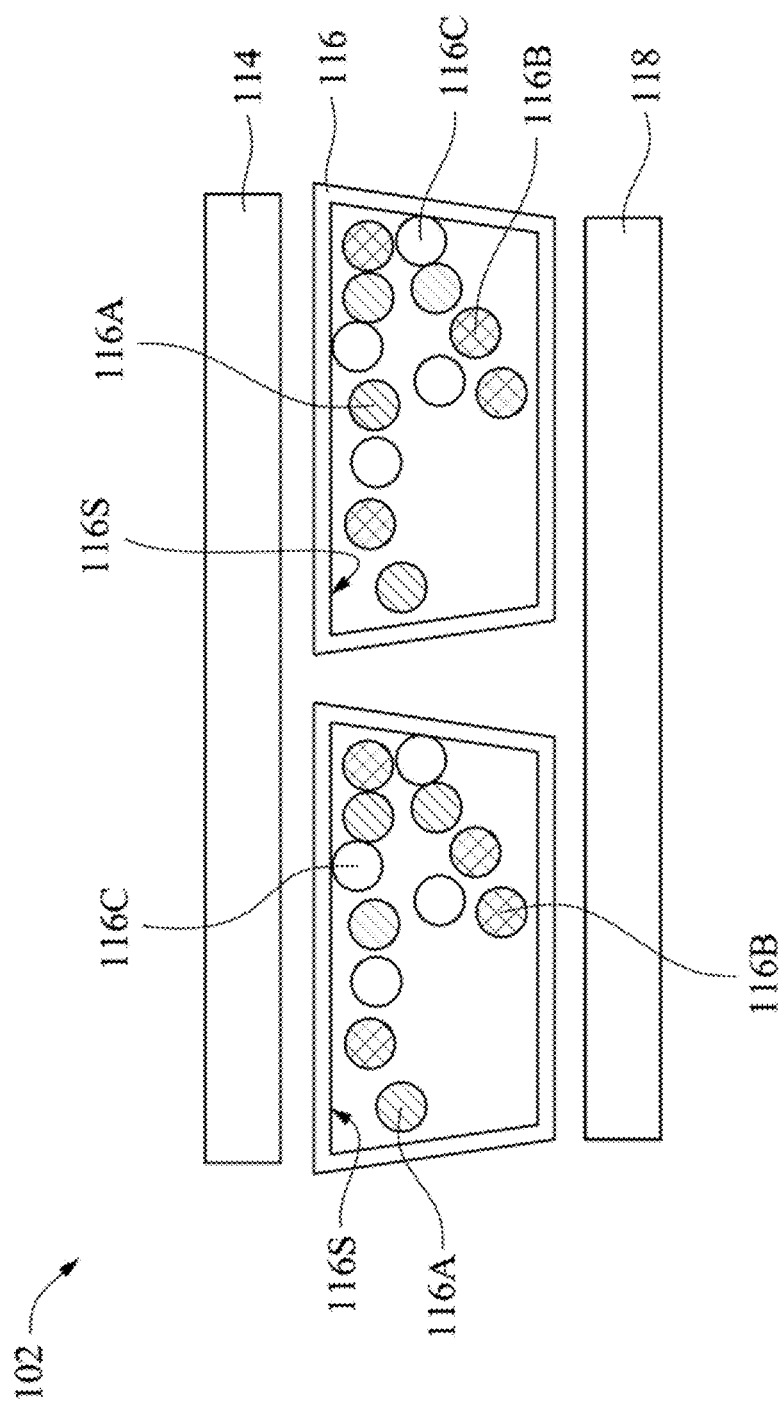
FIG. 11 is a cross-sectional view of a reflective display panel in accordance with some embodiments of the present disclosure.

FIG. 11 is a cross-sectional view of a reflective display panel 102 in accordance with some embodiments of the present disclosure. Referring to FIG. 11, the reflective display panel 102 can be a colored reflective display panel such that the display module 10 (see FIG. 1) or the display module 10a (see FIG. 5) can display a colored image. The colored reflective display panel is, for example, an electrophoretic display using colored electrophoretic particles. For example, the reflective display panel 102 has a single pixel including a top electrode layer 114, a plurality of electrophoretic units 116 and a driving substrate 118. The electrophoretic units 116 are disposed between the top electrode layer 114 and the driving substrate 118. The electrophoretic units 116 has a display side 116S close to the top electrode layer 114. In the present embodiment, the top electrode layer 114 is, for example, a transparent electrode layer. Each of the electrophoretic units 116 includes a plurality of white electrophoretic particles 116A, a plurality of colored electrophoretic particles 116B and a plurality of black electrophoretic particles 116C. The quantity of the electrophoretic units 116 and the electrophoretic particles of the electrophoretic units 116 are not limited to those shown in FIG. 11. In the present embodiment, the driving substrate 118 includes, for example, driving transistors. The driving transistors are configured to receive driving signals to allow the plurality of white electrophoretic particles 116A, the plurality of colored electrophoretic particles 116B and the plurality of black electrophoretic particles 116C of the electrophoretic units 116 move in the electrophoretic units 116.

In some embodiments, the white electrophoretic particles 116A can be, for example, electrophoretic particles with a negative charge. The colored electrophoretic particles 116B can be a combination of magenta electrophoretic particles, yellow electrophoretic particles and cyan electrophoretic particles. The black electrophoretic particles 116C can be, for example, electrophoretic particles with a positive charge. However, the present disclosure is not limited to the charge types of the white electrophoretic particles 116A, the colored electrophoretic particles 116B and the black electrophoretic particles 116C.

Figure 12:
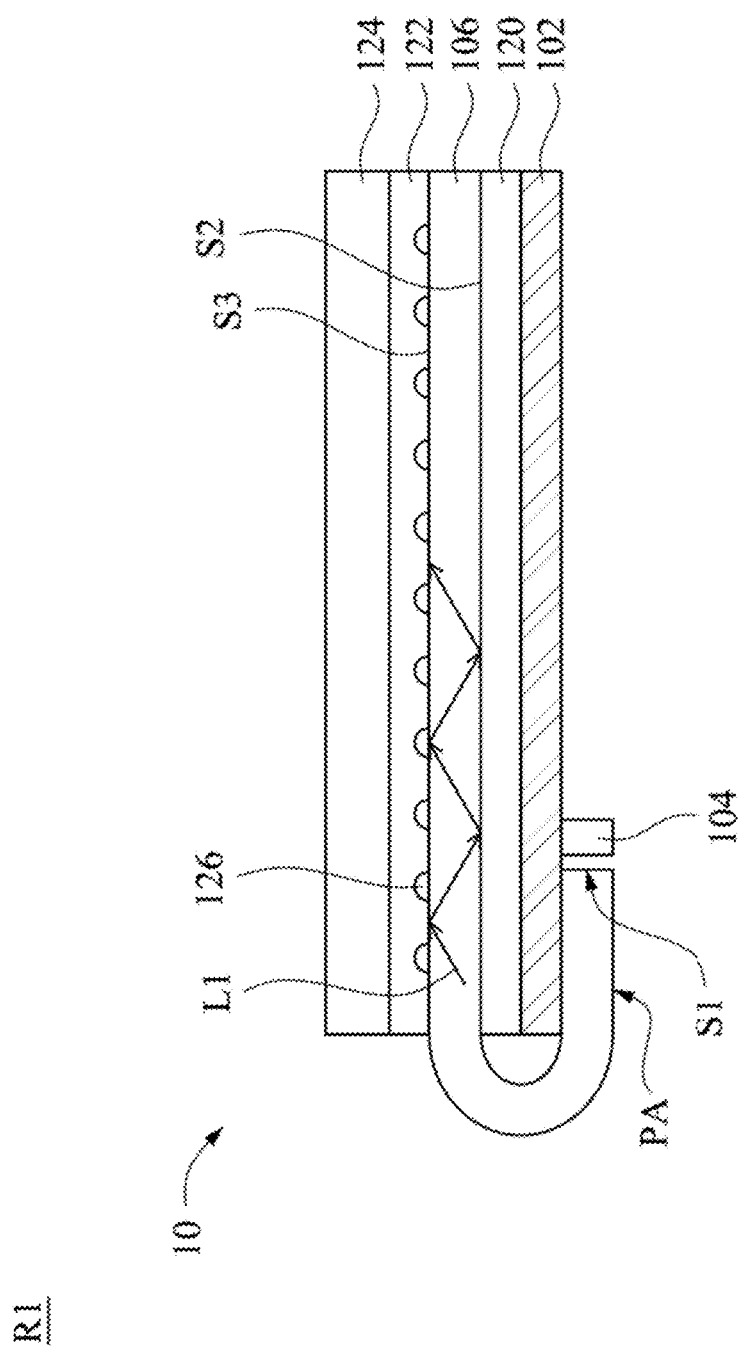
FIG. 12 is an enlarged view of a region of FIG. 3 in accordance with some embodiments of the present disclosure.

FIG. 12 is an enlarged view of a region R1 of FIG. 3 in accordance with some embodiments of the present disclosure. Referring to FIG. 12, the display module 10 further includes an optical clear adhesive 120, an optical clear adhesive 122 and a cover plate 124. The optical clear adhesive 120 is disposed between the reflective display panel 102 and the light guide plate 106. The optical clear adhesive 122 is between the cover plate 124 and the light guide plate 106. The optical clear adhesives 120, 122 have a refractive index of about 1.47. The light guide plate 106 has a refractive index of about 1.58. Therefore, after a light L1 emitted by the light source 104 (which includes a first light and a second light) enters the light guide plate 106 through the light entrance surface S1 of the light guide plate 106, it can travel in the light guide plate 106 by total reflection. The front surface S3 of the light guide plate 106 of the display module 10 further includes a collimated structure 126 to convert the light passing through the front surface S3 into a collimated light. Because the collimated light has a characteristic that a peak of the intensity of light is concentrated in a small angle of view, using the collimated light can provide adjustment for the direction of the intensity of light.

Figure 13:
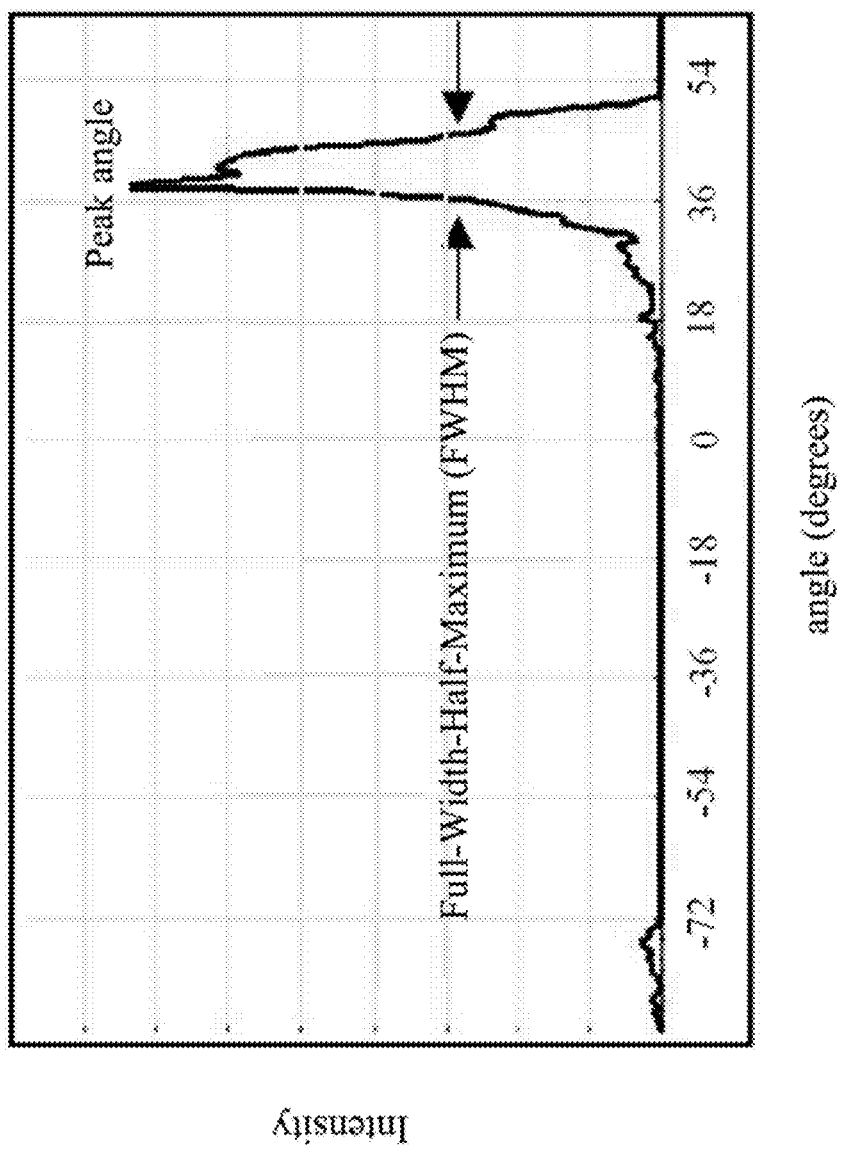
FIG. 13 is a spectrum of light passing through a collimated structure of the light guide plate in accordance with some embodiments of the present disclosure.

FIG. 13 is a spectrum of light passing through a collimated structure 126 of the light guide plate 106 in accordance with some embodiments of the present disclosure. Reference is made to FIGS. 12 and 13. An angle between the collimated light and a direction perpendicular to the front surface S3 of the light guide plate 106 is in a range from 25° to 45°. In other words, the collimated light has a peak angle in a range from 25° to 45°. In some embodiments, the collimated light has a full width at half maximum (FWHM) less than 25°.

FIG. 14 is a display performance of the reflective display panel 102 in accordance with the embodiment 5 of the present disclosure and a reflective display of contrast example 3 applied to a black and white electrophoretic display, an electrophoretic display using a color filter layer, and an electrophoretic display using colored electrophoretic particles. The reflective display of the contrast example 3 does not have a collimated structure. Reference is made to FIGS. 12 and 14. In the electrophoretic display using the color filter layer and the electrophoretic display using the colored electrophoretic particles, the performance of the reflective display panel 102 of the embodiment 5 is better than that of the reflective display of contrast example 3.

Based on above, the present disclosure provides a display module. The light guide plate of the display module is foldable. When the light mixing area is folded, the light mixing area is on the back surface of the light guide plate, thereby increasing a length of the light mixing area to reduce a quantity of auxiliary light sources.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display module, comprising:
  a front light module, comprising:
    a light source, comprising:
      a plurality of major light sources comprising a first color temperature; and
      a plurality of auxiliary light sources comprising a second color temperature, wherein the first color temperature is different from the second color temperature; and
    a light guide plate comprising a front surface comprising a light mixing area and an active area, wherein the light mixing area comprises a light entrance surface, the light source is disposed adjacent to the light entrance surface, wherein the plurality of major light sources has a spacing P1, the light mixing area has a length A extending along a direction perpendicular to the light entrance surface and satisfying an equation: $P1<A/0.7$; and
  a reflective display panel disposed on a back surface of the light guide plate, wherein the light mixing area of the light guide plate is foldable, when the light mixing area is folded, the light mixing area is on the back surface of the light guide plate.

2. The display module of claim 1, wherein a quantity of the plurality of auxiliary light sources is less than a quantity of the plurality of major light sources.

3. The display module of claim 1, wherein a quantity of the plurality of major light sources is greater than 2 times of a quantity of the plurality of auxiliary light sources.

4. The display module of claim 1, wherein the first color temperature is cold light, and the second color temperature is warm light.

5. The display module of claim 1, wherein the plurality of auxiliary light sources has a spacing P2, the light mixing area has a length A extending along a direction perpendicular to the light entrance surface and satisfying an equation: $P2<A/0.7$.

6. The display module of claim 1, further comprising:
  a light mixer disposed adjacent to the light entrance surface of the light guide plate, wherein the light source is disposed on a side surface of the light mixer.

7. The display module of claim 1, wherein the light source has a color rendering index (CRI) greater than 80.

8. The display module of claim 1, wherein the front surface of the light guide plate further comprises:
  a collimated structure to convert a light passing through the front surface into a collimated light, wherein an angle between the collimated light and a direction perpendicular to the front surface of the light guide plate is in a range from 25° to 45°.

9. The display module of claim 8, wherein the collimated light has a full width at half maximum (FWHM) less than 25°.

10. A display module, comprising:
  a front light module, comprising:
    a light source, comprising:
      a plurality of warm light sources; and
      a plurality of cold light sources, wherein the plurality of cold light sources has a quantity being more than 2 times of a quantity of the plurality of warm light sources; and
    a light guide plate comprising a front surface comprising a light mixing area and an active area, wherein the light mixing area comprises a light entrance surface, the light source is disposed adjacent to the light entrance surface, wherein the plurality of cold light sources has a spacing P1, the light mixing area has a length A extending along a direction perpendicular to the light entrance surface and satisfying an equation: P1<A/0.7; and
  a reflective display panel disposed on a back surface of the light guide plate.

11. The display module of claim 10, wherein the plurality of cold light sources has the quantity being 3 times of the quantity of the plurality of warm light sources.

12. The display module of claim 10, further comprising:
  a light mixer disposed adjacent to the light entrance surface of the light guide plate.

13. The display module of claim 12, wherein the light mixer has a connecting surface connecting the light entrance surface of the light guide plate and a side surface abutting the connecting surface, and the side surface is shorter than the connecting surface.

14. The display module of claim 10, wherein the plurality of cold light sources emits a white light.

15. A display module, comprising:
  a front light module, comprising:
    a light source, comprising:
      a plurality of major light sources comprising a first color temperature; and
      a plurality of auxiliary light sources comprising a second color temperature, wherein the first color temperature is different from the second color temperature;
    a light guide plate comprising a front surface comprising a light mixing area and an active area, wherein the light mixing area comprises a light entrance surface, the light source is disposed adjacent to the light entrance surface; and
    a light mixer disposed adjacent to the light entrance surface of the light guide plate, and having a connecting surface connecting the light entrance surface and a side surface abutting the connecting surface, wherein the light source is disposed on the side surface; and
  a reflective display panel disposed on a back surface of the light guide plate, wherein the light mixing area of the light guide plate is foldable, when the light mixing area is folded, the light mixing area is on the back surface of the light guide plate.

16. A display module, comprising:
  a front light module, comprising:
    a light source, comprising:
      a plurality of warm light sources; and
      a plurality of cold light sources, wherein the plurality of cold light sources has a quantity being more than 2 times of a quantity of the plurality of warm light sources;
    a light guide plate comprising a front surface comprising a light mixing area and an active area, wherein the light mixing area comprises a light entrance surface, the light source is disposed adjacent to the light entrance surface; and
    a light mixer disposed adjacent to the light entrance surface of the light guide plate, and having a connecting surface connecting the light entrance surface and a side surface abutting the connecting surface, wherein the light source is disposed on the side surface; and
  a reflective display panel disposed on a back surface of the light guide plate.

\* \* \* \* \*